L. M. Harris,
Pruning Hook.
Nº 46,797.      Patented Mar. 14, 1865.
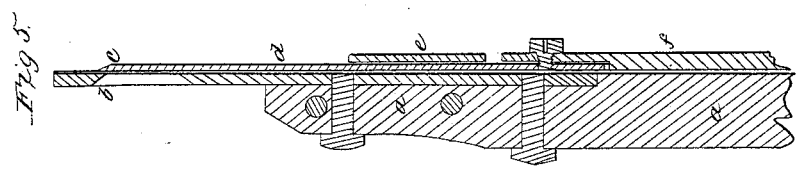
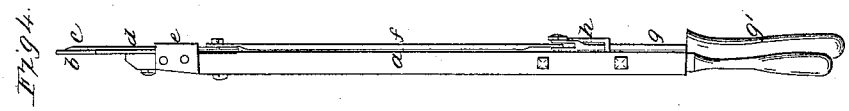
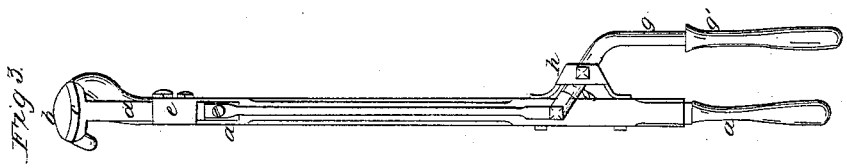
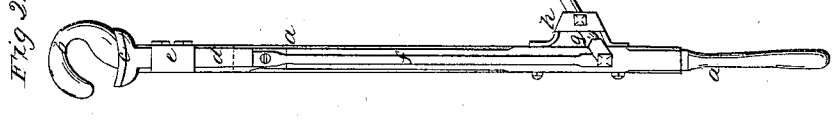
Witnesses             Inventor:

UNITED STATES PATENT OFFICE.

LEONARD M. HARRIS, OF MATTAWAN, MICHIGAN.

IMPROVEMENT IN PRUNING-HOOKS.

Specification forming part of Letters Patent No. 46,797, dated March 14, 1865.

*To all whom it may concern:*

Be it known that I, LEONARD M. HARRIS, of Mattawan, county of Van Buren, and State of Michigan, have invented a new and Improved Pruning-Hook; and I do hereby declare that the following is a full, clear, and exact description thereof, reference being had to the accompanying drawings, making a part of this specification, in which—

Figure 1 is a side view of the stock and cutting-hook with the movable cutter detached. Figs. 2 and 3 are side views of the implement complete, showing the movable cutter in two positions. Fig. 4 is an edge view of the implement. Fig. 5 is an enlarged sectional view showing the manner of applying the movable cutter to the fixed hook.

Similar letters of reference indicate corresponding parts in the several figures.

The object of my invention is to so construct an implement for pruning trees that the hook thereof will serve as a means for enabling a person to hold a branch in position and to sever it while thus held by means of a knife which cuts upward or toward the fixed hook, thereby obviating the objections to pruning-hooks having fixed cutters and movable hooks which cut downward, and frequently split the branches from this cause.

To enable others skilled in the art to understand my invention, I will describe its construction and operation.

A good pruning-hook should make a clear and smooth cut, and sever the branches with a single blow of the knife. It should also be so constructed that the power which it is necessary to exert to sever a branch can be applied to the knife which performs the most cutting. Another desirable quality in a pruning-hook is to have it compact and to be able to use it without injury to the trees. To effect these objects in a single implement, I apply to one end of a staff or handle, $a$, of a suitable length, a hook, $b$, the flat shank of which is let into one side of said handle flush with its surface, as shown in Figs. 4 and 5, and rigidly bolted to said handle. The hook tapers from its shank to its point, and its inside edge is made sharp by beveling it on the back side, as shown in Fig. 5. In conjunction with this hook $b$ I employ a movable knife, $c$, which is somewhat of a crescent shape and which has its curved upper edge beveled so as to form a knife-edge for cutting upward or toward the cutting-edge of the hook $b$. This knife is formed on the upper end of a slide, $d$, which moves in a line with the length of the handle $a$, to which it is applied by means of a wide strap, $e$, that keeps this slide with its knife in place and holds it tightly against the shank of the hook $b$. The knife $c$ forms a T-head on its shank or slide $d$, and extends across the hook $b$ in such manner as to close the end of this hook and confine the branch within it during the act of cutting. It being of a crescent form, it makes, in connection with the curved edge of the hook, a shear or draw cut at each end as it is thrust upward. The lower end of the knife-slide $d$ has a rod, $f$, pivoted to it, the opposite end of which rod is pivoted to the short arm of a curved lever, $g$. This lever is pivoted to and guided between a bearing, $h$, which is a light casting bolted to the handle $a$ near its lower end, as shown in Figs. 1, 2, 3, and 4. The lower end of the lever $g$ has a handle, $g'$, applied to it corresponding to the handle which is formed on the lower end of the staff $i$. The movable handle or lever $g$ is curved, so that it will be brought near the handle of the staff and conveniently used in the operation of pruning. By this arrangement it will be seen that the connecting-rod $f$ works in a line with the staff $a$—i. e., it does not project beyond this staff so as to be in the way. The arrangement of the lever $g$ enables me to exert great force by a movement similar to that of opening and closing a pair of shears.

In using my improved pruning-hook, the lever $g$ is moved outward, so as to depress the knife $c$. The limb or branch to be cut is then caught by the hook, and, if necessary, drawn down a short distance, to enable the operator to use the lever $g$ to the best advantage in cutting off the branch, which is done by forcing upward the knife with a quick movement against the lower side of the branch. By thus cutting from the lower side of a limb having its upper side bearing against the lower edge of the hook there is no liability of splitting the limb or branch which is left upon the tree.

By having a fixed hook on the upper end of the staff *a* it will also be seen that the implement will support itself by the branch when hooked upon it, and admit of the knife *c* being used without lifting the staff *a*, as in contrivances hitherto employed.

Having thus described my invention, what I claim as new, and desire to secure by Letters Patent, is—

1. The use of a hook, *b*, which is secured rigidly to its staff *a*, in combination with a knife, *c*, which slides upon the shaft *a* and is moved upward in the act of cutting, substantially as described.

2. The movable crescent-shaped knife *c*, formed on a slide, *d*, in combination with a hook, *b*, which is secured rigidly to its staff, substantially as described.

LEONARD M. HARRIS.

Witnesses:
  L. C. FITCH,
  A. McDONALD.